(12) United States Patent
Cotton (10) Patent No.: US 7,865,415 B2
(45) Date of Patent: Jan. 4, 2011

(54) INTELLIGENT SIMULATION ANALYSIS METHOD AND SYSTEM

(75) Inventor: Peter Cotton, New York, NY (US)

(73) Assignee: Morgan Stanley, New York, NY (US)

( * ) Notice: Subject to any disclaimer, the term of this patent is extended or adjusted under 35 U.S.C. 154(b) by 1774 days.

(21) Appl. No.: 10/793,139

(22) Filed: Mar. 4, 2004

(65) Prior Publication Data

US 2004/0236667 A1    Nov. 25, 2004

Related U.S. Application Data

(60) Provisional application No. 60/452,239, filed on Mar. 5, 2003.

(51) Int. Cl.
*G06Q 40/00* (2006.01)
(52) U.S. Cl. ....................................................... 705/35
(58) Field of Classification Search ................ None
See application file for complete search history.

(56) References Cited

U.S. PATENT DOCUMENTS

| | | | | |
|---|---|---|---|---|
| 5,444,819 | A | * | 8/1995 | Negishi ..................... 706/21 |
| 5,461,699 | A | | 10/1995 | Arbabi et al. |
| 5,761,386 | A | | 6/1998 | Lawrence et al. |
| 5,761,442 | A | | 6/1998 | Barr et al. |
| 2002/0046143 | A1 | * | 4/2002 | Eder ........................... 705/36 |
| 2002/0174056 | A1 | | 11/2002 | Sefein et al. |
| 2003/0093347 | A1 | * | 5/2003 | Gray .......................... 705/35 |

FOREIGN PATENT DOCUMENTS

| | | |
|---|---|---|
| EP | 1 107 157 | 6/2001 |
| JP | 04-373069 | 12/1992 |
| JP | 2000-506293 | 5/2000 |
| JP | 2001-175735 | 6/2001 |
| JP | 2002-099714 | 4/2002 |
| JP | 2002-236799 | 8/2002 |
| JP | 2003-044750 | 2/2003 |
| JP | 2004-528611 | 9/2004 |

OTHER PUBLICATIONS

Darrel Duffie et al., "Simulating Correlated Defaults", *Graduate School of Business*, Stanford University, Sep. 1999 pp. 1-47. (http://www.stanford.edu/~kenneths/credit_ddks.pdf).

(Continued)

*Primary Examiner*—Jason M Borlinghaus
(74) *Attorney, Agent, or Firm*—Weitzman Law Offices, LLC (57) ABSTRACT

A method for calculating pricing information for a financial instrument consisting of a plurality of underlying financial instruments that includes the steps of: calculating a default time vector for a plurality of default scenarios wherein each default time vector includes a measure of a likelihood of default for each of the plurality of underlying financial instruments; calculating one or more cash flows for a subset of the default scenarios thereby forming a training set; training a neural network with the training set; and using the neural network to estimate one or more cash flows for a remaining number of the plurality of default scenarios.

14 Claims, 7 Drawing Sheets

OTHER PUBLICATIONS

Hector Fabio Restrepo et al.,"A Network FPGA-Based Hardware Implementation of a Neural Network Application", *Logic Systems Laboratory, Swiss Federal Institute of Technology*, (http://www.teuscher-research.ch/download/christof/papers/restrepo00_fccm00.pdf).

Website: Intex Solutions, Inc., 110 A Street, Needham, MA 02494 (www.intex.com).

Website: RiskMetrics Group, 44 Wall Street, 22nd Floor, New York, NY 10005 (www.riskmetrics.com).

Website: Ligature, Inc., 257 Great Road, Acton, MA 01720 (http://www.ligatureltd.com/english/7_about.htm).

Website: Axeon Ltd., Davidson House, Science and Technology Park, Aberdeen, AB22 8GT, Scotland (http://www.axeon.com/unflashed/mainmenu/main_frame_control.htm).

Website: Synaptics, Inc., 2381 Bering Dr., San Jose, CA 95131 (http://www.synaptics.com/technology/pattern.cfm; http://www.synaptics.com/products/quickstroke.cfm).

Website: Silicon Recognition Inc., 1150 Industrial Avenue, Suite A, Petaluma, CA 94952 (http://www.silirec.com/).

Website: Silicon Recognition Inc., 1150 Industrial Avenue, Suite A, Petaluma, CA 94952 (http://www.silirec.com/).

T. Hastie et al., "The Elements of Statistical Learning: Data Mining, Inference, and Prediction", (*Springer Series in Statistics*), Ch. 3, 6, 8, 9, 11, 12.

Supplementary European Search Report (EP 04 71 8121) dated Jul. 28, 2008.

* cited by examiner

INTELLIGENT SIMULATION ANALYSIS METHOD AND SYSTEM

CROSS REFERENCE TO RELATED APPLICATIONS

The following application claims priority to U.S. Provisional Patent Application No. 60/452,239 filed Mar. 5, 2003 and entitled "Intelligent Simulation Analysis Method and System".

FIELD

The present invention relates to systems and methods for pricing complex financial instruments.

BACKGROUND

This invention relates to a system and method for improving the speed of calculating the price of complex financial instruments, such as Collateralized Debt Obligations.

The market for structured financial products, such as Collateralized Bond and Debt Obligations (CBOs and CDOs) has grown enormously in recent years. A CDO is a portfolio of debt instruments, typically corporate bonds, against which notes are issued. The notes have varying cash flow priority and credit quality depending on the subordination level of each note (i.e. tranche). The equity tranche provides the lowest subordination level, the mezzanine tranche reflects an intermediate level of subordination, and the senior tranche provides the highest level of subordination. Losses that occur when there is a credit event, such as a default of one of the debt instruments in the portfolio, are typically absorbed by the lowest tranche first. As such, notes from the equity tranche present a high level of risk and a large coupon, whereas notes from the senior tranche present a low level of risk and a small coupon. These structured financial products enable asset managers to diversify, create liquidity, and manage risk. As the market grows for these financial products, the need for accurate real-time pricing increases.

The prior art method for pricing structured financial products such as CDOs is slow. The typical approach includes determining the probable default times for each of the debt instruments in the CDO using simulation techniques such as those taught by Duffie-Singleton. (See *Simulating Correlated Defaults*, Darrel Duffie and Kenneth Singleton, September, 1999.) The probable default times may be represented as default time vectors. The cash flow associated with each default time vector is calculated, and a tentative price for the CDO is determined based on the cash flows and interest generated by the instruments comprising the CDO. The final price of the CDO is then determined using a Monte Carlo simulation in which the steps of determining a default time vector and the resulting cash flows based thereon is typically repeated up to 50,000 times for a given CDO. This process of pricing CDOs is very slow however, and therefore not suitable for pricing CDOs in a real-time market environment.

Accordingly, it is desirable to provide a system and method for calculating the price of complex products, such as CDOs, at a faster speed.

SUMMARY OF THE INVENTION

The present invention is directed to overcoming the drawbacks of the prior art. Accordingly, this invention provides a method and system for calculating the price of a financial instrument consisting of a plurality of underlying financial instruments at a faster speed than is possible using the prior art methods. Specifically, the present invention includes the steps of: (1) calculating a default time vector for a plurality of default scenarios, wherein each default time vector includes a measure of a likelihood of default for each of the plurality of underlying financial instruments; (2) calculating one or more cash flows for a subset of the default scenarios, thereby forming a training set; (3) training a neural network with the training set; and (4) using the neural network to estimate one or more cash flows for a remaining number of the plurality of default scenarios.

In one embodiment, the method further includes the steps of: (1) determining a tranche impact parameter for one or more of the default scenarios in the training set; (2) training a support vector machine with the tranche impact parameters associated with the default scenarios in the training set; (3) using the support vector machine to estimate a tranche impact parameter for one or more of the remaining number of the plurality of default scenarios; (4) training the neural network with the training set tranche impact parameters (in addition to the training set itself); and (5) using the neural network to estimate one or more cash flows for a remaining number of the plurality of default scenarios based, in part, on the tranche impact parameters.

In another embodiment, default vectors are used in place of default time vectors. A default vector represents an aggregation of defaults occurring during a finite time interval.

In other embodiments, methods for function estimation other than neural networks and support vector machines are utilized. Examples include, but are not limited to, linear regression, kernel methods, and regression trees.

The present invention includes the features of construction, combination of elements, and arrangement of parts that are exemplified in the following detailed disclosure, and the claims indicate the scope of the invention. Other features and advantages of the invention are apparent from the description, the drawings, and the claims.

DESCRIPTION OF THE FIGURES

For a fuller understanding of the invention, reference is made to the following description taken in conjunction with the accompanying figures, of which.

DETAILED DESCRIPTION

As discussed above, the present invention provides systems and methods for calculating the price of complex financial instruments, such as CDOs, at a faster speed than is possible using the prior art methods. The attached figures provide flowcharts and diagrams relating to the systems and methods of the present invention.

Definitions

In order to clearly describe the present invention, the following definitions are utilized in the following description.

A default time vector includes a measure of the likelihood of default of a financial instrument.

A default vector represents an aggregation of defaults occurring during a finite time interval.

A default scenario represents a financial instrument, combination of financial instruments, financial transaction, or other financial product or event, which presents a likelihood of default, and can be examined for the purpose of pricing a basket financial instrument which includes a plurality of underlying financial instruments or the like, wherein each, or at least a group of each of the plurality is associated with the default scenario.

A neural network is programmed into a computer system implementing the present invention, and represents a collection of input parameters (also known as nodes), hidden nodes, and output nodes, wherein the hidden nodes represent an algorithm which, when given values for the input nodes, yields values for the output nodes. The neural network is further defined by the connections between (1) the layer of input nodes and the layer of hidden nodes, and (2) the layer of hidden nodes and the layer of output nodes; wherein the connections (1) define changes (if any) to values (via calculations according to a formula for example) as the values move between the layers of nodes, and (2) determine which node in a layer receives a value associated with a node in another layer.

A training set represents a subset of a plurality of financial scenarios.

A tranche impact parameter indicates whether any of the tranches (e.g., equity, mezzanine, senior) within a particular financial scenario has defaulted in that particular scenario.

A support vector machine comprises a function which utilizes, at least, kernel methods to calculate values for specified output parameters when given values for certain input parameters.

Method Embodiments

Figure 1:
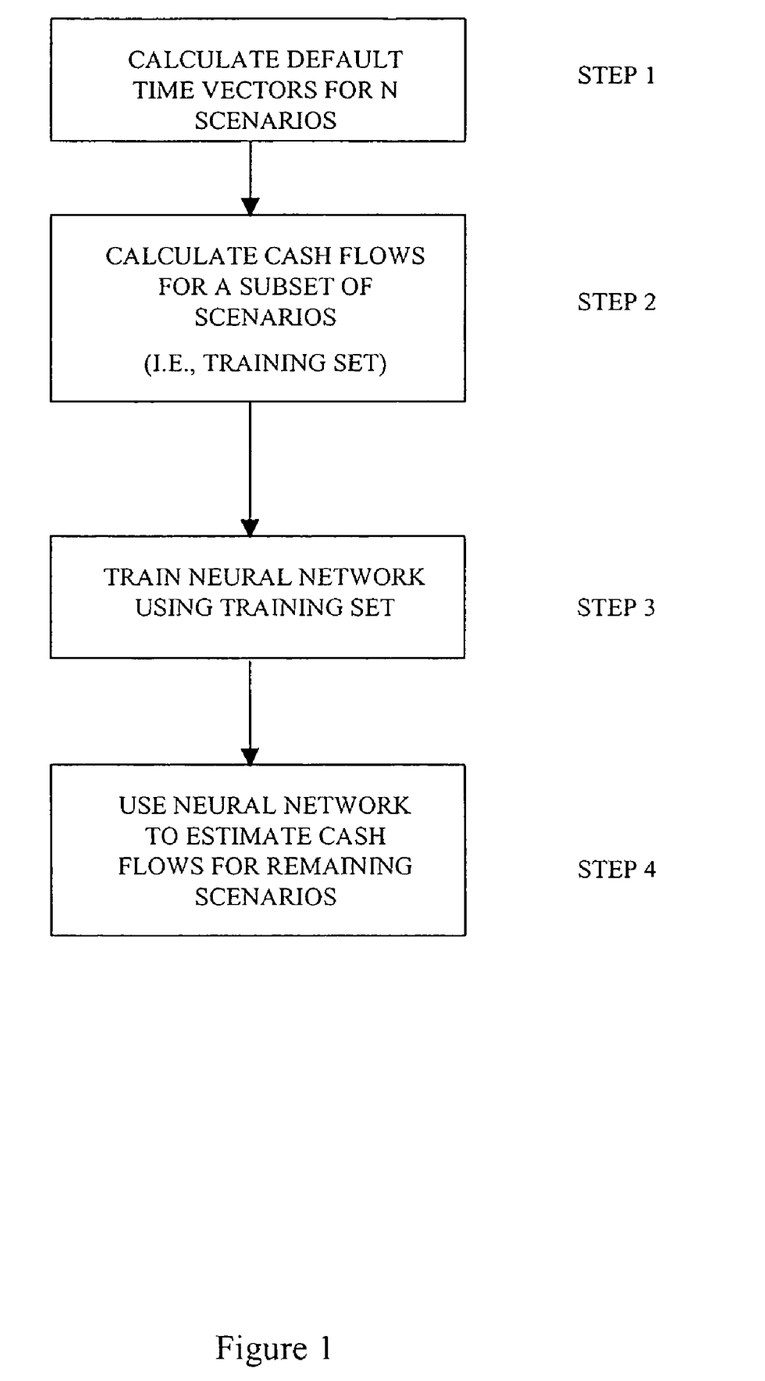
FIG. 1 is a flow chart of the price calculating method of the present invention according to an exemplary embodiment.

FIG. 1 depicts a flow chart of the price calculating method of the present invention. In Step 1, default time vectors for multiple scenarios are calculated using any known technique for calculating default time vectors (e.g., Duffie-Singleton). A default scenario represents a financial instrument, combination of financial instruments, financial transaction, or other financial product or event, which presents a likelihood of default, and can be examined for the purpose of pricing a basket financial instrument which includes a plurality of underlying financial instruments or the like, wherein each, or at least a group of each of the plurality is associated with the default scenario. In one embodiment, for example, default time vectors for 100,000 scenarios are calculated so that the cash flows associated with each of these scenarios may be used to price the financial instrument.

Next, in Step 2, one or more cash flows for each of a subset of the scenarios, (i.e., a training set), are calculated directly using known techniques. The cash flow calculations incorporate the default time vectors, and may also utilize other parameters associated with financial instruments such as, by way of non-limiting example, an amortization schedule of the assets in the portfolio (comprising a CDO for example), a contractual recovery schedule, a portfolio payout schedule, and a projected interest rate over the portfolio investment horizon.

Next, in Step 3, a neural network is designed and trained using the training set of cash flows calculated in Step 2. A neural network is programmed into a computer system implementing the present invention, and represents a collection of input parameters (also known as nodes), hidden nodes, and output nodes, wherein the hidden nodes represent an algorithm which, when given values for the input nodes, yields values for the output nodes. The neural network is further defined by the connections between (1) the layer of input nodes and the layer of hidden nodes, and (2) the layer of hidden nodes and the layer of output nodes; wherein the connections (1) define changes (if any) to values (via calculations according to a formula for example) as the values move between the layers of nodes, and (2) determine which node in a layer receives a value associated with a node in another layer.

By way of non-limiting example, a neural network can be designed to predict the cash flows (output layer) for a portfolio of securities given the default time vectors for the portfolio (input layer). The prior art techniques discussed above are used to calculate one or more cash flows for a subset of the portfolio, given the default time vectors for the subset, thereby forming a training set. The training set then helps define the connections and hidden nodes comprising the neural network such that the network can predict the cash flows for the entire portfolio, given the default time vectors for the portfolio. The process of designing and training a neural network is known. Finally in Step 4, the trained neural network is used to estimate one or more cash flows for the remaining scenarios.

Because using a neural network to calculate the cash flows for a portfolio of securities is significantly faster than the cash flow calculation techniques of the prior art (on the order of $10^6$ times faster), the time to determine the cash flows for the remaining scenarios is greatly reduced resulting in a significantly faster overall price calculation.

Figure 2:
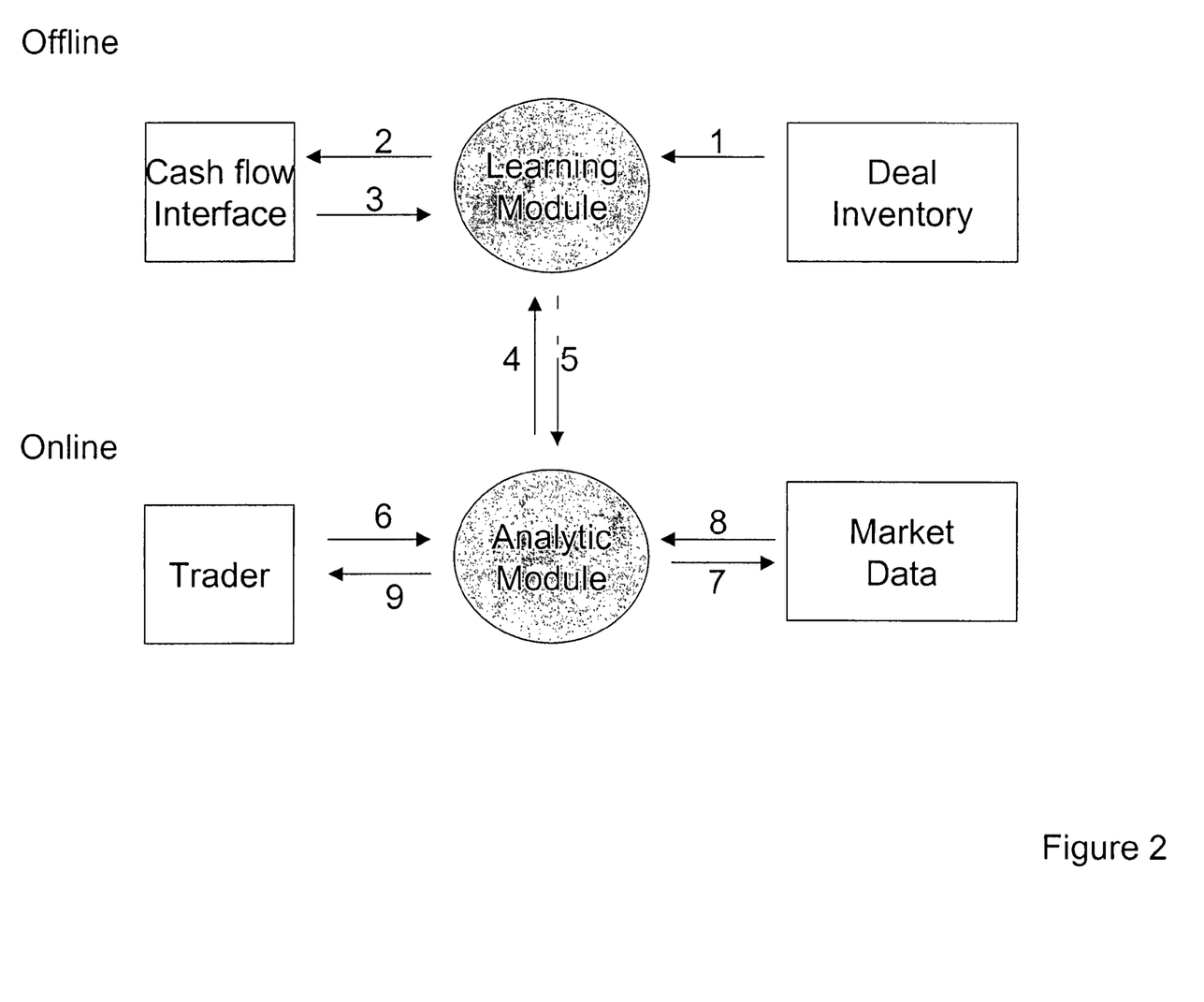
FIG. 2 is an information flow diagram according to an embodiment of the present invention.

FIG. 2 portrays an embodiment of the present invention wherein a neural network is designed and trained, and used to produce trade analysis information comprising in part, cash flows. Specifically, the embodiment comprises a mode of operation whereby real-time analysis on complex deals is delivered to traders. The mode of operation comprises both offline calculations, possibly performed at night or on the weekend, and online operations, typically performed during trading hours in response to traders' requests.

In Step 1, a learning module receives information from a deal inventory. This information can include trade ticket data comprising counter-party data, trade structure data (including, by way of non-limiting example, details of the deal waterfall, coverage tests, cash flow diversions, reserve funds), trade tranche data (including identification of (1) the owner of each part of the capital structure, and (2) which part each owner possesses), and other trade data.

In Step 2, the learning module submits the trade data to a cash flow interface. The cash flow interface is a gateway to company internal or third party external programs which determine, for a given financial scenario, future hypothetical cash flows occurring between deal participants. These cash flows can include, but are not limited to coupon payments, interest payments, principal payments, management fees, and credit event payments. The cash flow interface, or rather the program with which said interface interfaces, computes these deal numbers using financial scenario information including, but not limited to the future time of default of assets in a predetermined portfolio ("reference portfolio"), the interest rates at future times, the traded spreads of assets at future times, and other information.

In Step 3, the cash flow interface returns to the learning module, the hypothetical cash flow data, including, but not limited to coupon payments, interest payments, principal payments, management fees, and credit event payments. Steps 2 and 3 are repeated a plurality of times for a plurality of financial scenarios. It is preferable to analyze thousands of differing financial scenarios, so to construct a broad set of information with which to train the learning module (see Step 5 below).

In Step 4, the learning module requests information from the analytic module pertaining to previous training data. This information assists the learning module. Then, in Step 5, the learning module performs offline statistical learning using information from the analytic module and the results of the hypothetical cash flow analyses relayed to the learning module in Step 3. In this step, one or more "deal approximations" are constructed. A deal approximation is a formula, program, or other representation of an algorithm, which receives a hypothetical financial scenario and returns corresponding hypothetical cash flow details. A deal approximation approximates the same calculations occurring in Step 2, but does so pursuant to a much more efficient computation process. In some cases, the approximation may be thousands of times faster. The cash flow learning module reports results of the learning process (i.e. deal approximation creation process) to the analytic module.

In Step 6, a trader requests a price valuation or other analysis of a deal. For example, a trader could make a request for the price of an asset backed bond subject to certain parameter assumptions such as spread, volatility, correlation between underlying assets comprising the security, and interest rates are examples of said parameters.

In Step 7, the analytic module makes a request for market data from internal or external sources, or a combination thereof. The market data complements the request data from the trader and is relevant to the deal which the trader would like analyzed.

In Step 8, the market data is sent to the analytic module. The analytic module performs analysis of the deal making use of the deal approximation discussed in Step 5. Because the deal approximation is computationally efficient, complex analytic techniques including, but not limited to Monte Carlo analysis may be performed in real time.

Finally, in Step 9, the deal analysis is relayed to the trader. The information relayed to the trader may comprise a deal valuation or other analyses, in numerical or graphical format. For example, an analysis returned to the trader can include a distribution of profit or loss, possibly estimated from thousands of simulations.

Figure 3:
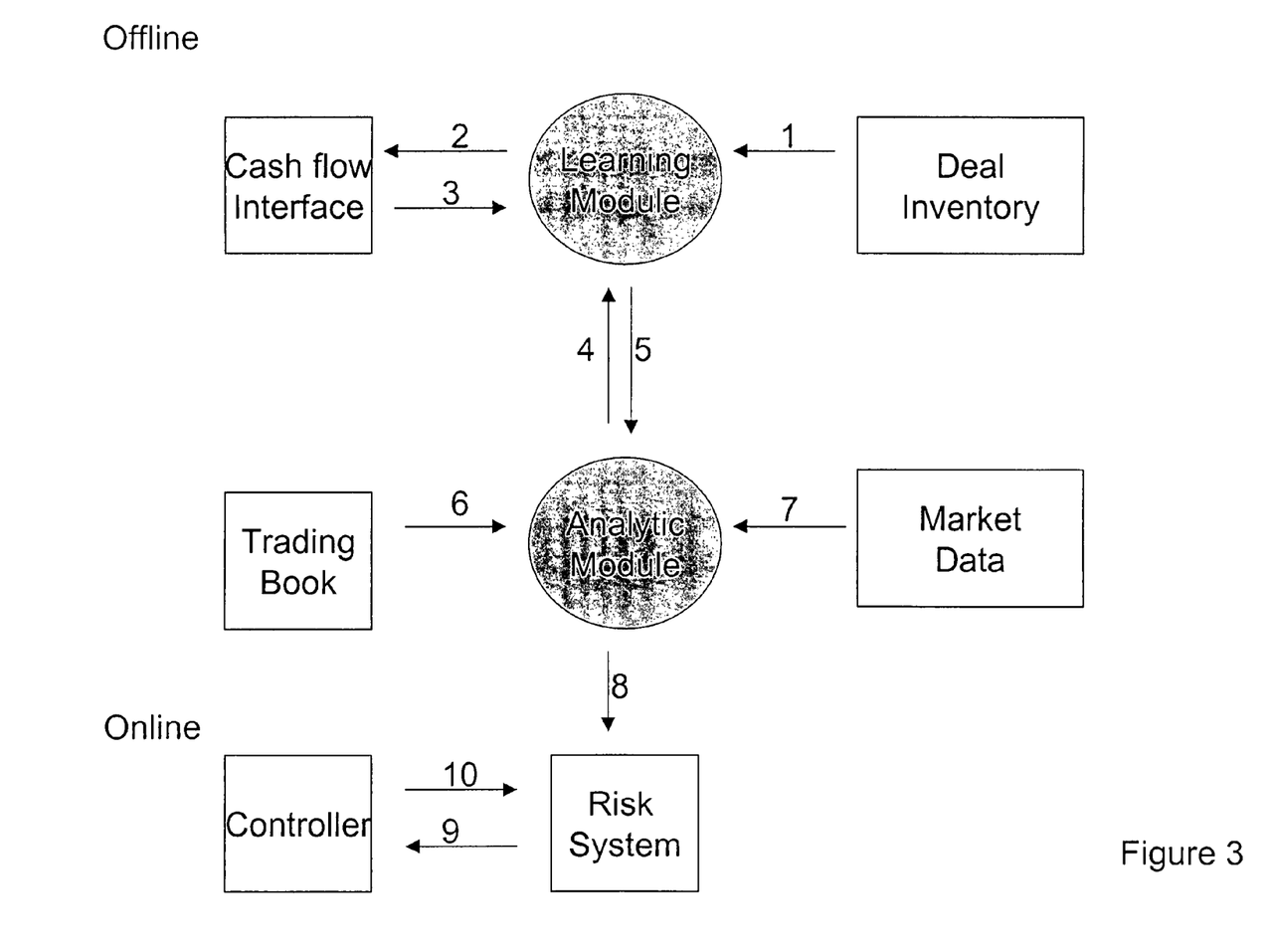
FIG. 3 is an information flow diagram according to an embodiment of the present invention.

FIG. 3 portrays another embodiment in which a neural network is designed and trained, and used to produce trade analysis information. While the first five steps are the same as in FIG. 2, the remaining steps can vary. For example, as shown in FIG. 3, Steps 6 and 7 of FIG. 2 can take place while the analytic engine is in offline mode. As such, the analytic engine can analyze trading books over the weekend or overnight.

In step 6, a trade in the current inventory is sent to the analytic engine. In Step 7, market data is sent to the analytic engine. The analytic engine combines trade data, market data, and learning data from the learning module in order to arrive at a market to market valuation for the trade. Steps 6 and 7 are repeated a plurality of times. In Step 8, the results of the analysis performed are reported to a firm risk system. In Step 9, the risk system produces a risk report based on analysis data, and sends the report to a firm controller, which in Step 10, returns comments on the risk presented, which can include, but are not limited to, orders to halt or continue the analyzed trading. The controller produces and sends its commentary in real time.

In one embodiment, the neural network is implemented in software. In another embodiment, the neural network is implemented in hardware using, for example, a Field Programmable Gate Array (FPGA) architecture.

In a further embodiment, the training set size is increased, thereby sacrificing price calculation speed for more accurate pricing which more closely tracks the pricing achieved using the prior art calculation techniques. Alternatively, the training set size can be reduced, which results in faster calculations at the expense of pricing accuracy.

Figure 4:
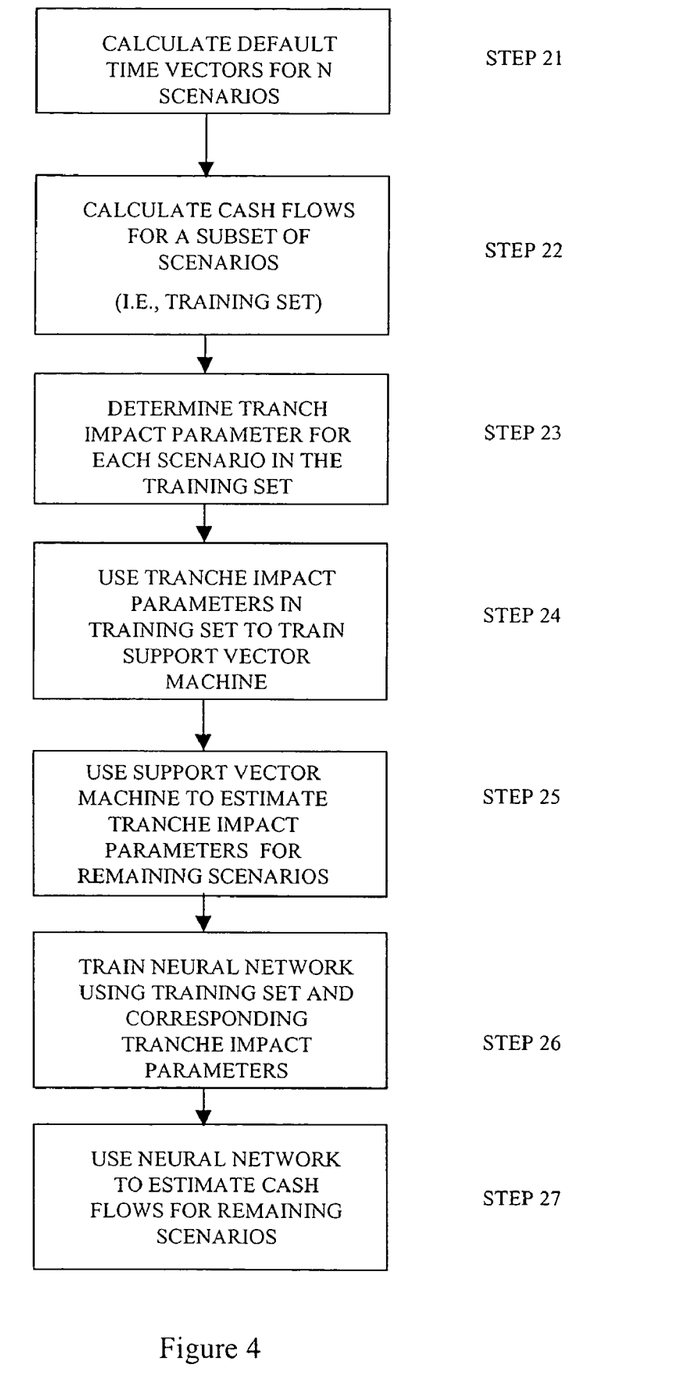
FIG. 4 is a flow chart of the price calculating method of the present invention according to an exemplary embodiment.

FIG. 4 portrays a flow chart for an exemplary embodiment of the price calculating method of the present invention. In Step 21, the default time vectors for multiple scenarios are calculated in the same way as described with respect to Step 1 of FIG. 1. Next, in Step 22, one or more cash flows for each of a subset of scenarios (i.e., training set) are calculated in the same way as in Step 2 of FIG. 1. Next, in Step 23, a tranche impact parameter is calculated for one or more scenarios in the training set; whereby the parameter indicates whether any of the tranches (e.g., equity, mezzanine, senior) within a particular scenario has defaulted in that particular scenario. By way of non-limiting example, the tranche impact parameter for a scenario would equal 1 if defaults in a reference portfolio of securities fall within a level of subordination associated with a tranche within the scenario. Conversely, the impact parameter would equal 0 if the defaults fall short of a subordination level reflected by the tranche(s) within the scenario.

Next, in Step 24, the tranche impact parameters calculated for the scenarios in the training set are used to design and train a support vector machine. A support vector machine is similar to a neural network in that it provides a function which yields values for specified output parameters when given values for particular input parameters. Additionally, a support vector machine utilizes kernel methods to calculate the values of the output parameters. The kernel method basically takes a weighted average of the products of two or more vectors. For example, applying the kernel method to vectors A (3, 5, 7) and B (2, 4, 6) would involve assigning some predetermined weighting to each of 6, 20, and 42, and then summing them.

By way of non-limiting example, a support vector machine can be designed to calculate the tranche impact parameter associated with one or more of a collection of scenarios, wherein each scenario includes one or more tranches, given the level of default corresponding to a reference portfolio of securities associated with each scenario. The impact parameter associated with one or more of a subset of the collection of scenarios is set to 0 or 1 depending on whether the level of default falls within the subordination level associated with the tranche(s) within the subset, thereby forming a training set. The training set tranche impact parameters then help define the function and kernel method comprising the support machine vector such that the support machine can predict the tranche impact parameters for one or more of the entire collection of scenarios, given the level of default corresponding to the reference portfolio of securities associated with each scenario. The method of designing and training a support vector machine is known.

Next, in Step 25, the trained support vector machine is used to estimate tranche impact parameters for one or more of the remaining scenarios. Then, in Step 26, the neural network is trained using the training set calculated in Step 22 and the corresponding tranche impact parameters calculated in Step 23. This process of training the neural network is similar to the training process of Step 3 of FIG. 1 described above, except that the tranche impact parameters are added to the layer of input nodes. Finally, in Step 27, the neural network is used to estimate one or more cash flows for the remaining scenarios based on their default time vectors and associated tranche impact parameters.

Adding tranche impact parameters to the layer of input nodes increases the accuracy with which the neural network estimates the cash flows for a portfolio of securities, without increasing-the operational time.

Figure 5:
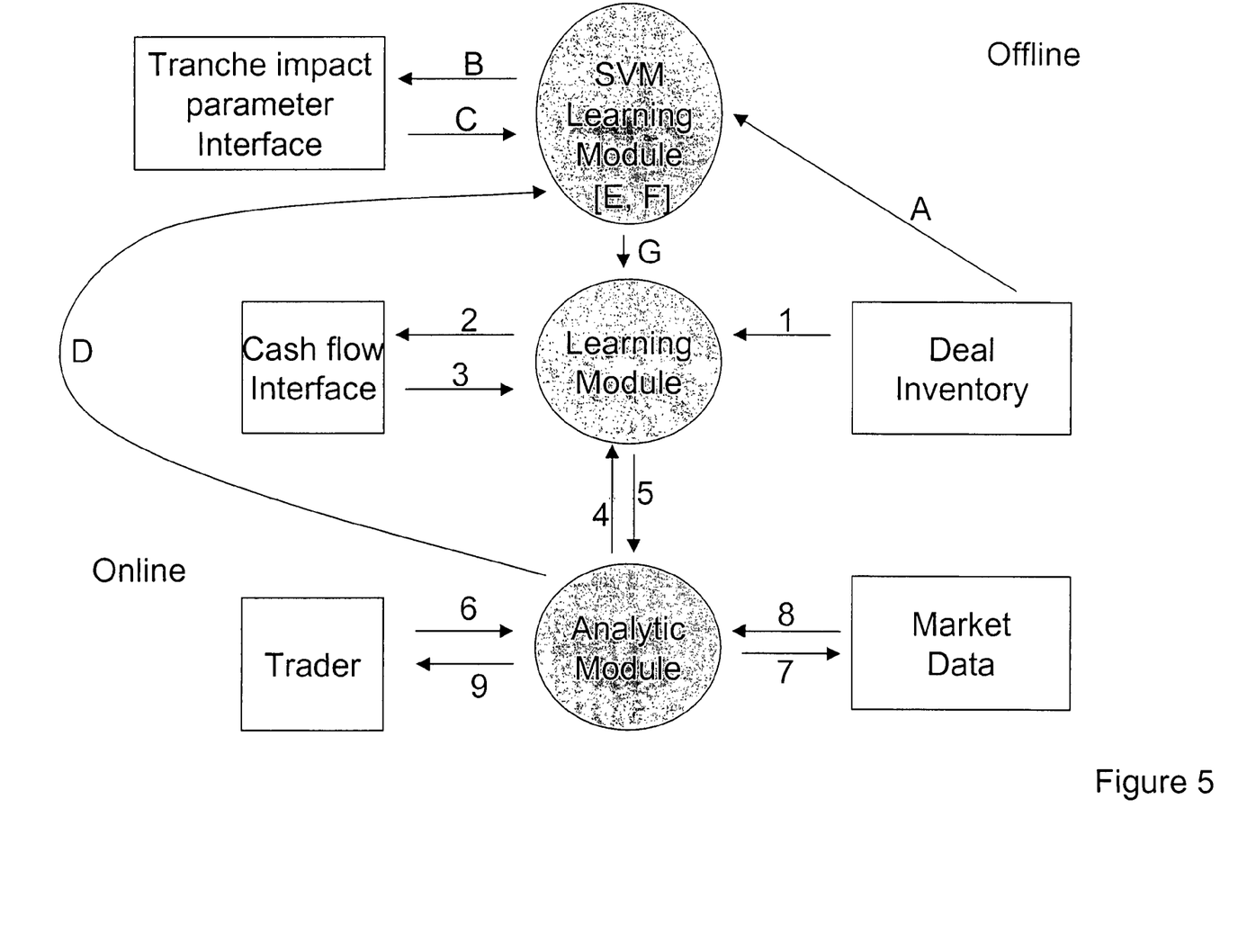
FIG. 5 is an information flow diagram according to an embodiment of the present invention.

As shown in FIG. 5, the exemplary embodiments of FIGS. 2 and 3 can be modified to include a support vector machine as an additional learning module ("SVM learning module), wherein the SVM learning module: (A) receives from the deal inventory, default level information for various financial scenarios; (B) submits the default level information to a tranche impact parameter interface which is a gateway to company internal or third party external programs which determine tranche impact parameters for the financial scenarios; (C) receives the tranche impact parameter information back from the tranche impact parameter interface; (D) receives information from the analytic module pertaining to previous training data; (E) performs offline statistical learning using the tranche impact parameter information and training data to construct various "tranche impact approximations"; (F) uses the tranche impact approximations to determine the tranche impact parameters for various additional scenarios (i.e., repeats Step E a plurality of times); and (G) forwards the tranche impact parameter data to the cash flow learning module for use in performing the "deal approximations" of Step 5 of FIGS. 2 and 3. As such, the analytic module can more accurately determine in real time, the cash flows for a financial transaction, by using the tranche impact parameter approximations in addition to the deal approximations.

A number of embodiments of the present invention have been described. Nevertheless, it will be understood that various modifications may be made without departing from the spirit and scope of the invention.

System Embodiments

Based on the above description, it would be obvious to one of ordinary skill that some implementations of the present invention can include proprietary software installed from a computer readable medium, such as a CD-ROM. Inventive concepts may therefore be implemented in digital electronic circuitry, computer hardware, firmware, software, or in combinations of the above. Data can be generated, received, transmitted, processed and stored as digital data. In addition, it would be obvious to use a conventional database management system such as, by way of non-limiting example, Sybase, Oracle and DB2, as a platform for implementing the present invention.

Some apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 6:
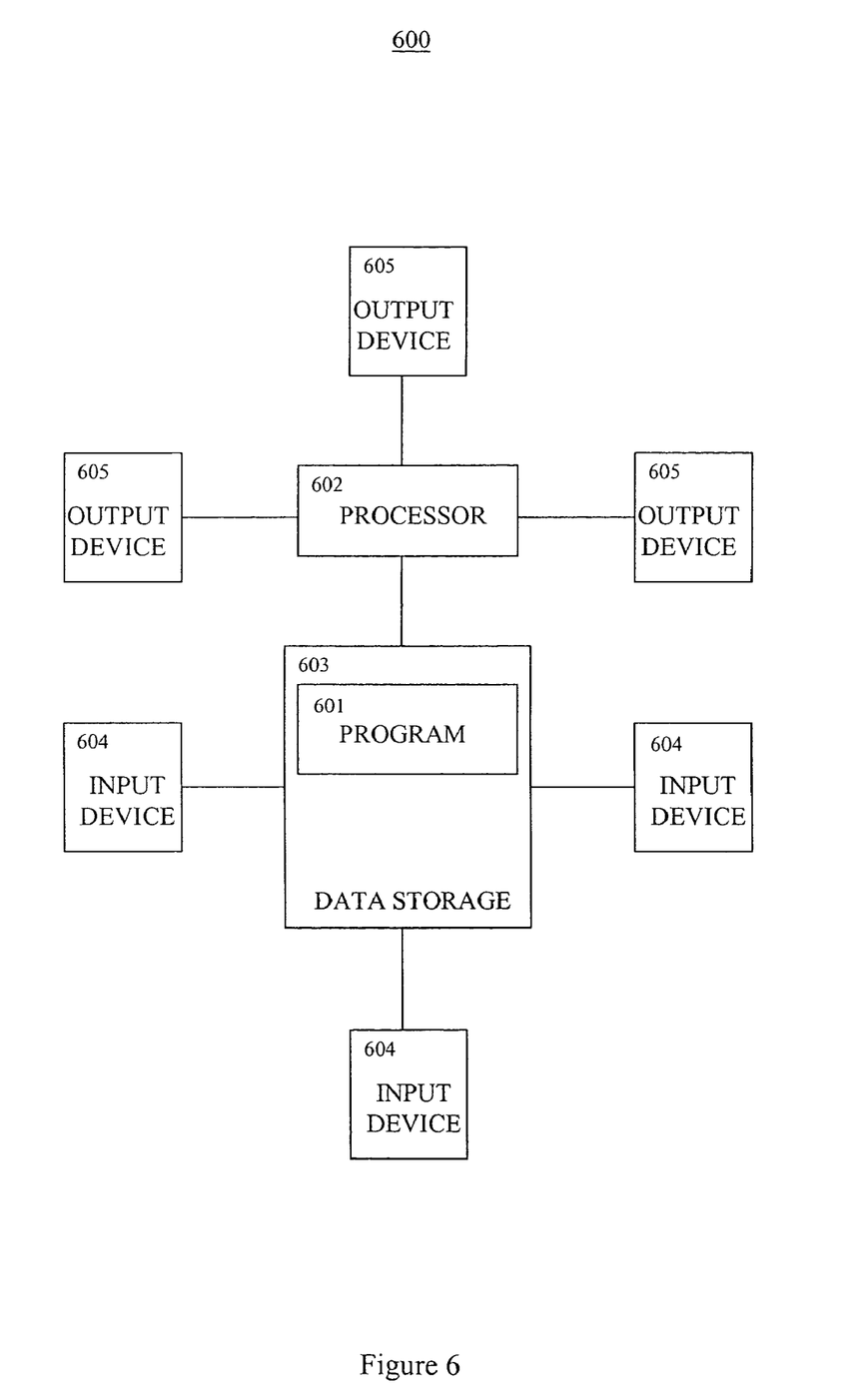
FIG. 6 is a block diagram of the price calculating system of the present invention according to an exemplary embodiment.

For example, FIG. 6 illustrates an embodiment in which one or more computer programs (601) are executable on a programmable system (600) including at least one programmable processor (602) coupled to receive data and instructions from, and to transmit data and instructions to, a digital data storage system or other electronic storage (603); at least one input device (604); and at least one output device (605).

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Figure 7:
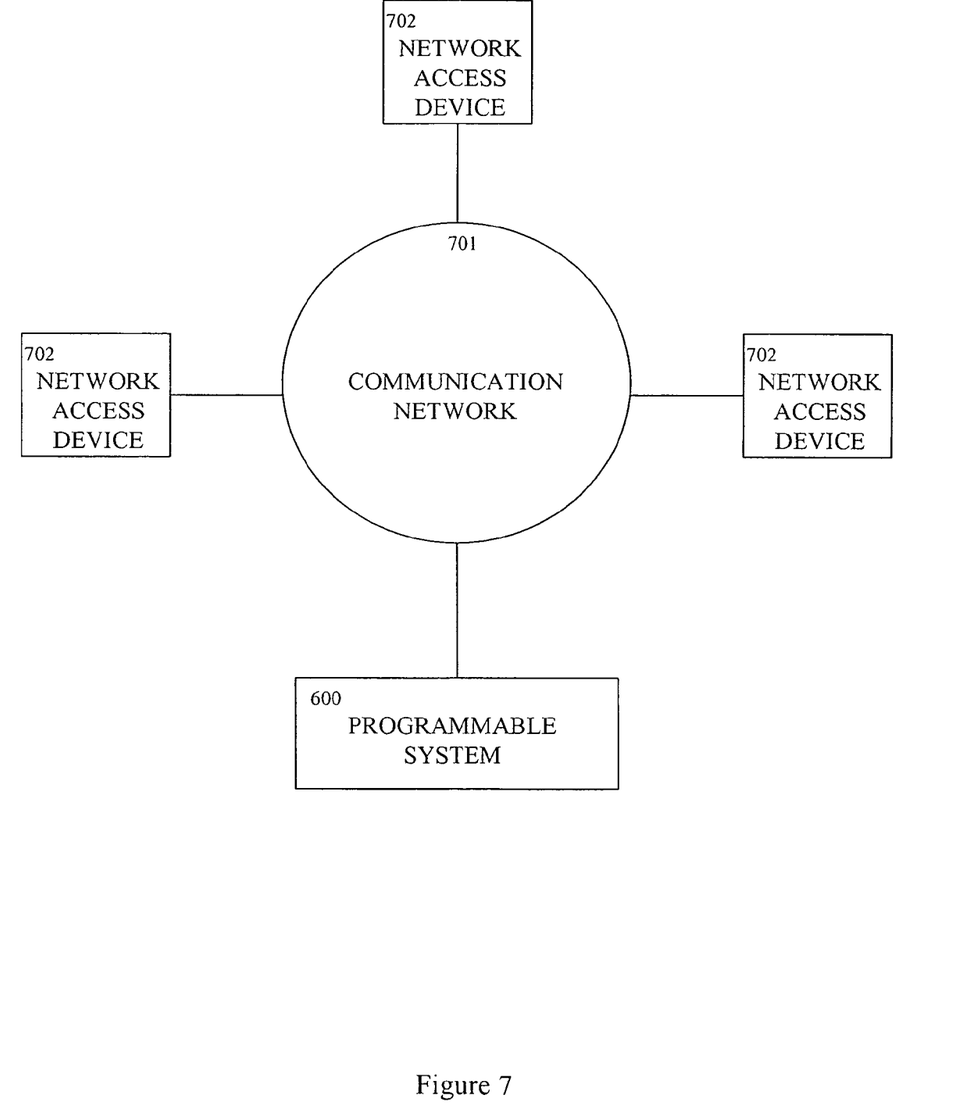
FIG. 7 is a block diagram of the price calculating system of the present invention according to an exemplary embodiment.

Also, as shown in FIG. 7, the programmable system of FIG. 6 (600) can be implemented over a communication network (701). Network access devices (702) can include personal computers executing operating systems such as Microsoft Windows™, Unix™, or Apple Mac OS™, as well as software applications, such as JAVA programs or web browsers. Other network access devices can be terminal devices, palm-type computers, mobile WEB access devices, or other devices that can adhere to a point-to-point or network communication protocol such as the Internet protocol. Computers and network access devices can include processors, RAM and/or ROM memories, display capabilities, input devices, and hard disk or other relatively permanent storage.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computer-implemented method for calculating pricing information of a financial instrument comprising a plurality of underlying financial instruments, the method comprising:

calculating in a computer system, a default time vector for each of a plurality of default scenarios wherein each default time vector includes a measure of a likelihood of default for each of said plurality of underlying financial instruments;

calculating in the computer system, one or more cash flows for a subset of said default scenarios;

training in the computer system, a neural network with said subset of said default scenarios, wherein the calculated cash flows for the subset of default scenarios are used as output training vectors for the neural network and the calculated default time vectors for each default scenario within the subset of default scenarios are used as input training vectors for the neural network; and using said trained neural network in the computer system, to estimate one or more cash flows for a remaining number of said plurality of default scenarios.

2. The method of claim 1, further comprising the steps of:

determining in the computer system, a tranche impact parameter for one or more of said default scenarios in said subset of said default scenarios;

training in the computer system, a support vector machine with said tranche impact parameters associated with said default scenarios in said subset of said default scenarios; and using a support vector machine in the computer system, to estimate a tranche impact parameter for one or more of said remaining number of said plurality of default scenarios;

wherein the step of training in the computer system, a neural network with said subset of said default scenarios includes the step of:

training in the computer system, a neural network with said tranche impact parameters associated with said default scenarios in said subset of said default scenarios; and wherein the step of using said neural network in the computer system, to estimate one or more cash flows for a remaining number of said plurality of default scenarios includes the step of:

using said neural network in the computer system, to estimate one or more cash flows for said remaining number of said plurality of default scenarios based on said tranche impact parameters.

3. The method of claim 1, wherein the number of default scenarios comprising the subset is increased.

4. The method of claim 1, wherein the number of default scenarios comprising the subset is decreased.

5. The method of claim 2, wherein the tranche impact parameter for a default scenario is set to 1 when a level of default falls within a level of subordination associated with a tranche within the default scenario; and the parameter is set to 0 when the level of default falls outside the level of subordination.

6. The method of claim 1, wherein said neural network is implemented in software.

7. The method of claim 1, wherein said neural network is implemented in hardware.

8. A computer system for calculating pricing information of a financial instrument comprising of a plurality of underlying financial instruments, the system comprising:
a programmable processor;
a computer software executable on the computer system;
a data storage system;
at least one input device; and
at least one output device;
the computer software operative with the processor to cause the data storage system to receive a plurality of default scenarios via the at least one input device; and cause the processor to:
calculate a default time vector for each of the plurality of default scenarios wherein each default time vector includes a measure of a likelihood of default for each of said plurality of underlying financial instruments;
calculate one or more cash flows for a subset of said default scenarios;
train a neural network with said subset of said default scenarios, wherein the calculated cash flows for the subset of default scenarios are used as output training vectors for the neural network and the calculated default time vectors for each default scenario within the subset of default scenarios are used as input training vectors for the neural network;
use the trained neural network to estimate one or more cash flows for a remaining number of said plurality of default scenarios; and
forward said one or more cash flows to the at least one output device.

9. The computer system of claim 8, wherein the computer software is further operative with the processor to further cause the processor to:
determine a tranche impact parameter for one or more of said default scenarios in said subset of said default scenarios;
train a support vector machine with said tranche impact parameters associated with said default scenarios in said subset of said default scenarios;
use the support vector machine to estimate a tranche impact parameter for one or more of said remaining number of said plurality of default scenarios;
train the neural network with said tranche impact parameters associated with said default scenarios in said subset of said default scenarios; and
use said neural network to estimate one or more cash flows for said remaining number of said plurality of default scenarios based on said tranche impact parameters.

10. The system of claim 8, wherein the number of default scenarios comprising the subset is increased.

11. The system of claim 8, wherein the number of default scenarios comprising the subset is decreased.

12. The system of claim 9, wherein the tranche impact parameter for a default scenario is set to 1 when a level of default falls within a level of subordination associated with a tranche within the default scenario; and the parameter is set to 0 when the level of default falls outside the level of subordination.

13. The system of claim 8, wherein said neural network is implemented in software.

14. The system of claim 8, wherein said neural network is implemented in hardware.

* * * * *